(12) United States Patent
Holmquist

(10) Patent No.: US 7,530,745 B2
(45) Date of Patent: *May 12, 2009

(54) FIBER OPTIC CONNECTOR AND METHOD

(75) Inventor: Marlon E. Holmquist, Gibbon, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/689,298

(22) Filed: Mar. 21, 2007

(65) Prior Publication Data

US 2007/0183721 A1  Aug. 9, 2007

Related U.S. Application Data

(63) Continuation of application No. 10/942,545, filed on Sep. 16, 2004, now Pat. No. 7,201,518.

(60) Provisional application No. 60/562,696, filed on Apr. 14, 2004.

(51) Int. Cl.
*G02B 6/36* (2006.01)

(52) U.S. Cl. .......................................... 385/60; 385/53

(58) Field of Classification Search .................... 385/53, 385/60, 72, 75, 77, 78
See application file for complete search history.

(56) References Cited

U.S. PATENT DOCUMENTS 4,579,418 A    4/1986  Parchet et al.
4,747,659 A    5/1988  Takahashi
5,016,970 A    5/1991  Nagase et al.
5,096,276 A    3/1992  Gerace et al.
5,136,681 A    8/1992  Takahashi
5,142,598 A    8/1992  Tabone (Continued)

FOREIGN PATENT DOCUMENTS

EP        1 072 914 A2    1/2001

(Continued)

OTHER PUBLICATIONS

Drawing of a connector by ADC Telecommunications, Inc., 1 sheet, admitted as prior art.

(Continued)

*Primary Examiner*—Sarah Song
(74) *Attorney, Agent, or Firm*—Merchant & Gould P.C.

(57) ABSTRACT

A fiber optic connector including a ferrule surrounding an optical fiber and a hub engaging the ferrule. The hub includes a front portion having first and second surfaces and first and second tapered contact regions extending from the first and second surfaces to a front face. A housing includes an anti-rotation seat configured to engage the first and second surfaces, the anti-rotation seat including first and second angled contact surfaces positioned at a front of the anti-rotation seat. A spring within a chamber of the housing biases the ferrule through a bore in the front of the housing. The first tapered contact region of the hub engages the first contact surface, and the second tapered contact region engages the second contact surface when the hub and ferrule are in a first rotational position so that the optical fiber is maintained at a known orientation with respect to the connector.

5 Claims, 5 Drawing Sheets

U.S. PATENT DOCUMENTS

| | | |
|---|---|---|
| 5,146,525 A | 9/1992 | Tabone |
| 5,212,252 A | 5/1993 | Aoki et al. |
| 5,212,752 A | 5/1993 | Stephenson et al. |
| 5,257,333 A | 10/1993 | Nodfelt |
| 5,317,663 A | 5/1994 | Beard et al. |
| 5,390,269 A | 2/1995 | Palecek et al. |
| 5,633,970 A | 5/1997 | Olson et al. |
| 5,682,451 A | 10/1997 | Lee et al. |
| 5,734,769 A | 3/1998 | Lu |
| 5,852,694 A | 12/1998 | Kumura et al. |
| 5,946,436 A | 8/1999 | Takashi |
| 6,102,581 A | 8/2000 | Deveau |
| 6,142,676 A | 11/2000 | Lu |
| 6,155,146 A | 12/2000 | Andrews |
| 6,206,581 B1 | 3/2001 | Driscoll et al. |
| 6,428,215 B1 | 8/2002 | Nault |
| 6,464,402 B1 | 10/2002 | Andrews |
| 6,550,978 B2 | 4/2003 | De Marchi |
| 6,550,979 B1 | 4/2003 | Fleenor et al. |
| 6,913,392 B2 | 7/2005 | Gregorzewska et al. |
| 6,916,120 B2 | 7/2005 | Zimmel et al. |
| 7,201,518 B2 * | 4/2007 | Holmquist .................. 385/60 |
| 2003/0215191 A1 | 11/2003 | Taira et al. |

FOREIGN PATENT DOCUMENTS

| | | |
|---|---|---|
| EP | 1 072 915 A2 | 1/2001 |
| JP | 57-74714 | 5/1982 |
| JP | 3-84801 | 8/1991 |
| JP | 7-56053 | 3/1995 |

OTHER PUBLICATIONS

Suhner Fiberoptic, *Adjusting instructions*, Dok-Nr.: 52.01.4001.4, pp. 1-7, issued Mar. 30, 1994, last amendment May 18, 2001.

* cited by examiner

FIBER OPTIC CONNECTOR AND METHOD

RELATED APPLICATIONS

This application is a continuation of non-provisional patent application Ser. No. 10/942,545, filed on Sep. 16, 2004, which claims priority to provisional patent application Ser. No. 60/562,696, filed on Apr. 14, 2004, the disclosures of which are incorporated by reference.

TECHNICAL FIELD

The present invention relates to fiber optic connectors for use in an optical fiber signal transmission system, and to methods for assembling such fiber optic connectors.

BACKGROUND

Fiber optic cables are used in the telecommunication industry to transmit light signals in high-speed data and communication systems. A standard fiber optic cable includes a fiber with an inner light transmitting optical core. Surrounding the fiber is an outer protective casing.

A fiber terminates at a fiber optic connector. Connectors are frequently used to non-permanently connect and disconnect optical elements in a fiber optic transmission system. There are many different fiber optic connector types. Some of the more common connectors are FC and SC connectors. Other types of connectors include ST and D4-type connectors.

A typical SC fiber optic connector includes a housing having a front end positioned opposite from a rear end. The front end of the SC connector housing is commonly configured to be inserted within an adapter. An example adapter is shown in U.S. Pat. No. 5,317,663, assigned to ADC Telecommunications, Inc. The SC connector typically further includes a ferrule that is positioned within the front and rear ends of the housing, and adjacent the front end. The ferrule is axially moveable relative to the housing, and is spring biased toward the front of the connector. The fiber optic cable has an end that is stripped. The stripped end includes a bare fiber that extends into the connector and through the ferrule.

A connector, such as the connector described above, is mated to another connector within an adapter like the adapter of U.S. Pat. No. 5,317,663. A first connector is received within the front portion of the adapter, and a second fiber is received within the rear portion of the adapter. When two connectors are fully received within an adapter, the ferrules (and hence the fibers internal to the ferrule) contact or are in close proximity to each other to provide for signal transmission between the fibers. A further SC connector is shown in U.S. Pat. No. 6,428,215, assigned to ADC Telecommunications, Inc. Another connector and mating adapter is shown in U.S. Pat. No. 6,142,676, also assigned to ADC Telecommunications, Inc.

Rotational misalignment of a ferrule with respect to a connector axis can cause mis-engagement between the ferrule and a ferrule of another connector, thereby contributing to signal loss. This problem is especially acute for angled physical contact connectors. An angled physical contact (APC) connector includes a ferrule and fiber with end faces that are polished to a non-perpendicular angle (for example, 8 degrees to a perpendicular plane) with respect to the longitudinal axis of the connector. APC connectors are discussed in U.S. Pat. No. 5,734,769, assigned to ADC Telecommunications, Inc. The orientation of the end face must be maintained with a high degree of precision so that the angled end face of the optic fiber and associated ferrule correctly engage an end face of an optic fiber and associated ferrule of another angled physical contact connector. Even a few degrees of misalignment can cause significant signal loss.

SUMMARY

The present invention concerns fiber optic connectors having a spring biased ferrule and hub assembly held within the connector. The hub includes an anti-rotation portion which engages a complementary-shaped anti-rotation seat of the connector. The anti-rotation seat further includes at least first and second contact surfaces, and the anti-rotation portion of the hub includes first and second mating contact surfaces which maintain the end face of the optic fiber and associated ferrule at a specific rotational angle with respect to the longitudinal axis of the connector when the ferrule is in its resting position. Further, when the ferrule is pushed back into the connector and then allowed to return to its resting position, the contact surfaces re-engage to return the end face of the optic fiber and associated ferrule to the desired orientation. The contact surfaces are sized and shaped to allow the ferrule to return to its resting position without damaging the connector parts, such as due to sharp edges. Also, the contact surfaces are sized and shaped to only allow the ferrule to extend from the connector within a range that allows connection to other connectors, so that the ferrule is not extended too far or too little when mated to another connector.

One aspect of the invention relates to a fiber optic connector including an optical fiber, a ferrule surrounding the optical fiber, a hub retainably engaging the ferrule, wherein the hub includes a front portion having first and second surfaces, and first and second tapered contact regions at an angle with respect to a longitudinal axis of the connector, a housing defining an anti-rotation seat configured to engage the first and second surfaces of the front portion of the hub, the anti-rotation seat including first and second contact surfaces positioned at a front of the anti-rotation seat adjacent a bore defined by the housing through which the ferrule extends, and a spring disposed within a chamber defined by the housing and coupled to the anti-rotation seat, the spring biasing the ferrule through the bore of the housing, wherein the first tapered contact region of the hub engages the first contact surface and the second tapered contact region engages the second contact surface when the hub and ferrule are in a first rotational position relative to the housing so that an end of the optical fiber is maintained at a known orientation with respect to the longitudinal axis of the connector. The tapered contact regions on the hub are preferably planar surfaces, preferably smaller than the contact surfaces of the housing. In one preferred embodiment, three tapered contact regions and three contact surfaces are provided.

Another aspect of the invention relates to a hub and ferrule assembly for a fiber optic connector including a ferrule configured to surround an optical fiber, and a hub retainably engaging the ferrule, wherein the hub includes a front portion having first and second surfaces and first and second tapered contact regions at an angle with respect to a longitudinal axis extending through a center of the hub and ferrule assembly, wherein the first tapered contact region is positioned to engage a first contact surface on the fiber optic connector and the second tapered contact region is positioned to engage a second contact surface on the fiber optic connector. The tapered contact regions on the hub are preferably planar surfaces, preferably smaller than the mating contact surfaces in the connector. In one preferred embodiment, three tapered contact regions are provided.

Yet another aspect of the invention relates to a fiber optic connector housing including an exterior body configured to be received in a fiber optic adapter, a cavity defined by a rear portion of the connector housing, an anti-rotation seat coupled to the cavity, the anti-rotation seat including a plurality of longitudinally extending surfaces, and first and second angled contact surfaces positioned at a front of the anti-rotation seat adjacent a bore; the first and second angled contact surfaces being spaced apart around a longitudinal axis of the connector housing. In one preferred embodiment, three contact surfaces are provided.

Another aspect of the invention relates to a fiber optic connector including an optical fiber, a ferrule surrounding the optical fiber, a hub retainably engaging the ferrule, the hub including an anti-rotation portion, a housing defining an anti-rotation seat configured to engage the anti-rotation portion of the hub, a spring disposed within a chamber defined by the housing and coupled to the anti-rotation seat, the spring biasing the ferrule through the bore of the housing, and an alignment arrangement formed by the connector, the alignment arrangement including first and second tapered contact regions formed on one of the hub and the housing, and also including first and second contact surfaces formed on the other of the hub and the housing, wherein the first tapered contact region engages the first contact surface and the second tapered contact region engages the second contact surface when the hub and ferrule are in a first rotational position relative to the housing so that an end of the optical fiber is maintained at a known orientation with respect to the longitudinal axis of the connector. The tapered contact regions are preferably planar surfaces, and preferably smaller than the contact surfaces. In one preferred embodiment, three tapered contact regions and three contact surfaces are provided.

Yet a further aspect of the invention relates to a method for using a fiber optic connector comprising steps of: providing a ferrule surrounding an optical fiber with a hub retainably engaging the ferrule, the hub including opposing first and second tapered contact portions; providing a housing including a first contact surface positioned to engage the first tapered contact portion and a second contact surface positioned to engage the second tapered contact portion; pushing the ferrule back to disengage the first and second tapered portions of the hub from the first and second contact surfaces of the housing; and releasing the ferrule so that the first tapered contact portion engages the first contact surface and the second tapered contact portion engages the second contact surface, thereby retaining the optical fiber at a known orientation with respect to the longitudinal axis of the connector. The tapered contact regions are preferably planar surfaces, and preferably smaller than the contact surfaces. Preferably, three tapered contact portions and three contact surfaces retain the optical fiber at the known orientation.

DETAILED DESCRIPTION OF THE PREFERRED EMBODIMENT

Figure 1:
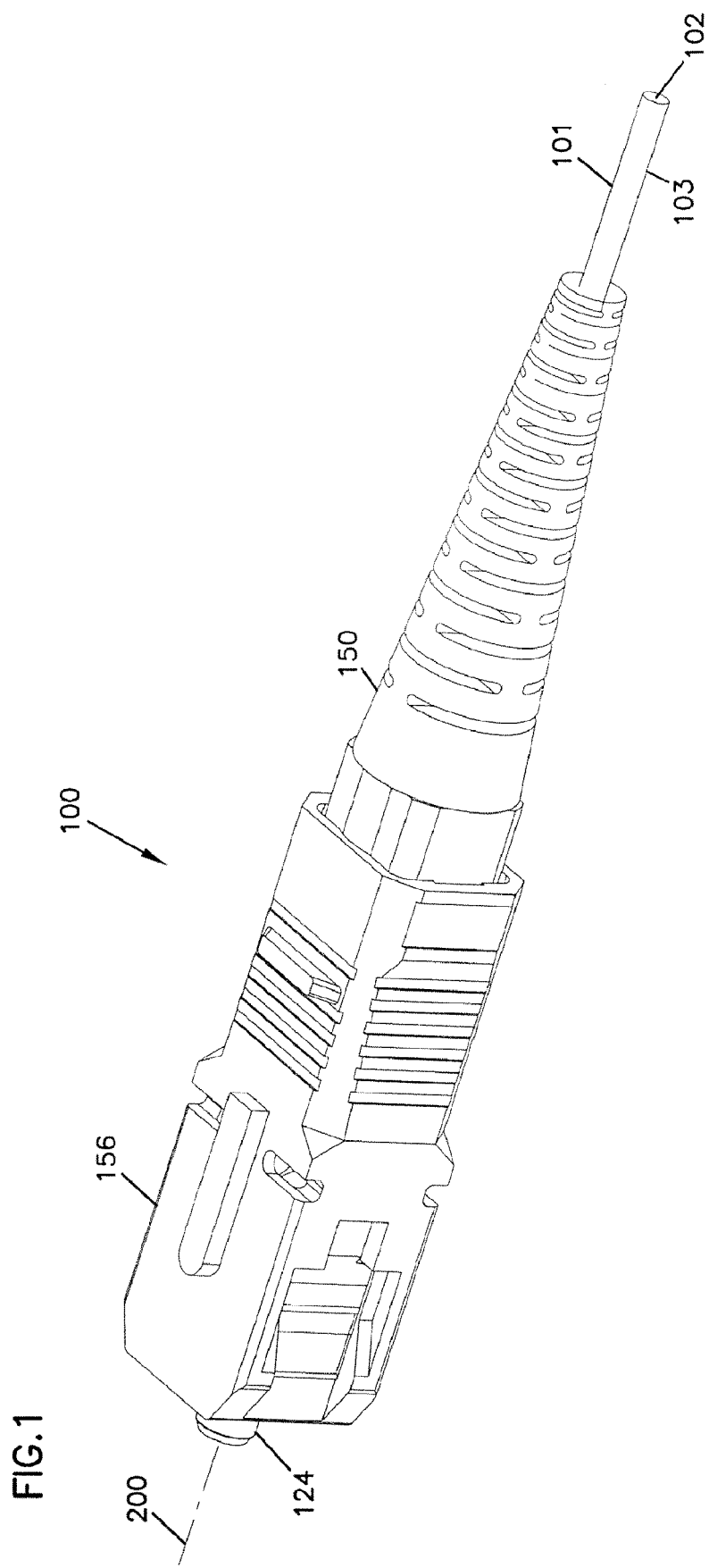
FIG. 1 is a perspective few of an embodiment of a fiber optic connector in accordance with the present invention.
Figure 2:
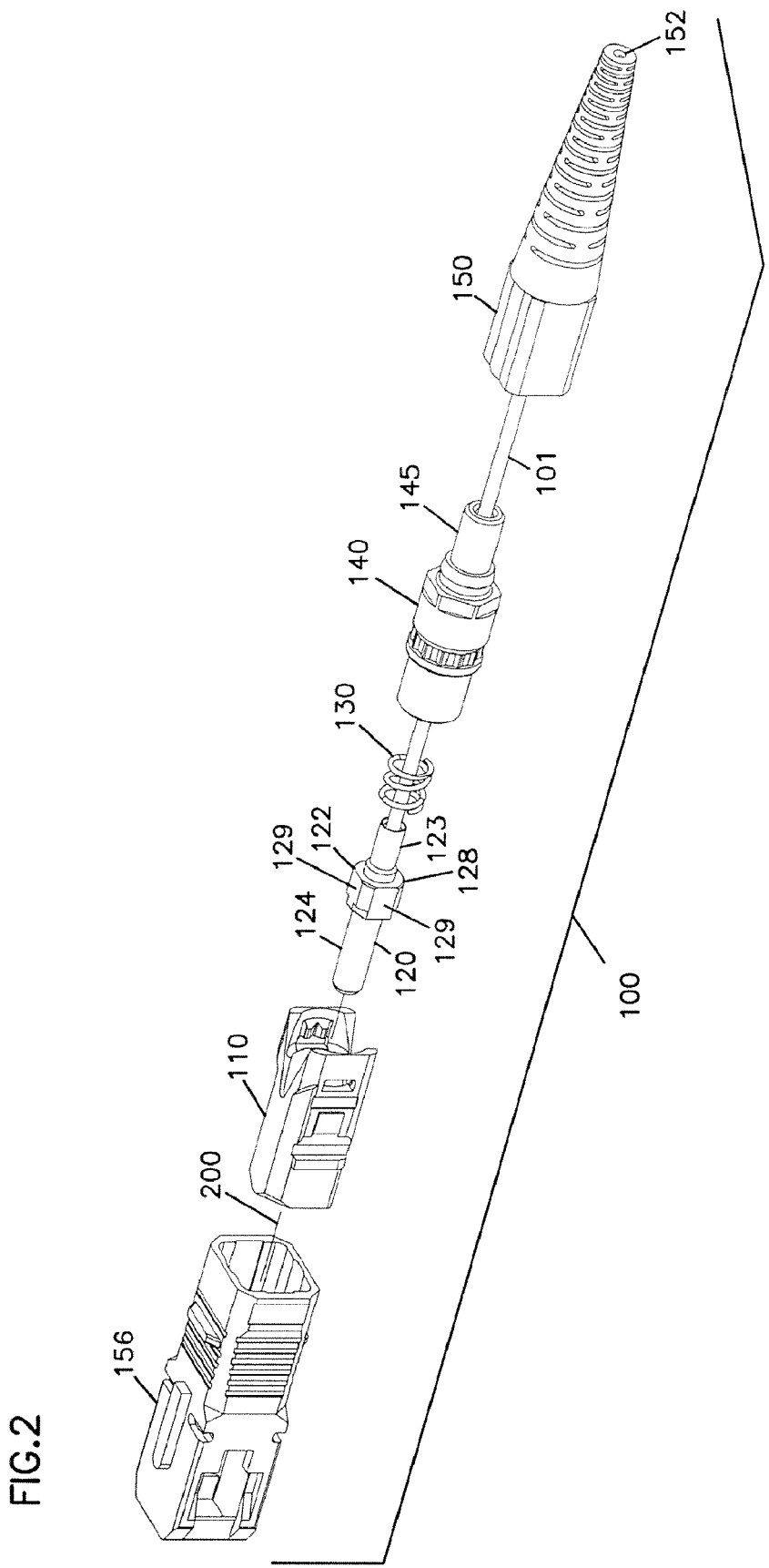
FIG. 2 is an exploded view in perspective of the connector shown in FIG. 1.

Reference will now be made in detail to exemplary aspects of the present invention that are illustrated in the accompanying drawings. Wherever possible, the same reference numbers will be used throughout the drawings to refer to the same or like parts.

FIGS. 1-8 illustrate an example embodiment of a connector 100 made in accordance with the present invention. The connector 100 is of the SC type. The connector 100 includes a front housing 110, a rear housing 140, and a boot 150 with a bore 152. A grip 156 fits over the front housing 110, and the rear housing 140. The boot 150 fits into a rear end 158 of the grip 156. Also included in the connector 100 is a hub/ferrule assembly 120 with a hub 122 and a ferrule 124. The hub 122 includes an anti-rotation portion 128 and an elongated cylindrical rear portion 123. The hub 122 is connected to the ferrule 124, such as with adhesive or an interference fit. A spring 130 is also provided. A fiber optic cable 101 is shown including a fiber 102 and a jacket 103.

The connector 100 is tunable by rotating the front housing 110 relative to the rear housing 140. Once the grip 156 is positioned over the front and rear housing 110, 140, the front housing 110 can no longer be rotated relative to the rear housing 140. In order to rotate the front housing 110 relative to the rear housing 140, the hub 122 must be pushed back out of engagement with the front housing 110.

Disposed within the rear housing 140 is an anti-rotation seat 112 and a cavity 114. The anti-rotation portion 128 of the hub 122 is slidingly engaged along the longitudinal axis 200 in the anti-rotation seat 112. The anti-rotation portion 128 of the hub 122 includes an exterior surface of hub 122 extending parallel to the axis 200 having a configuration which does not allow rotation when the anti-rotation portion 128 of the hub 122 is mated with the anti-rotation seat 112. In the illustrated embodiment, the anti-rotation portion 128 of the hub 122 includes a plurality of surfaces defining a bread loaf shape. In particular, three planar and perpendicularly arranged surfaces 129 are provided defining generally three sides of the hub 122. A fourth surface 131 is generally rounded (see FIG. 7), thereby defining the bread loaf shape. The anti-rotation seat 112 is provided with a similar profile for mating with the anti-rotation portion 128. Further details regarding the tunability feature and the anti-rotation feature of the connector 100 are described and shown in U.S. Pat. No. 6,428,215, the disclosure of which is hereby incorporated by reference.

The spring 130 surrounds the elongated cylindrical rear portion 123 of the hub 122. The spring is captured between the anti-rotation portion 128 and a surface 146 of the rear housing 140. The spring 130 functions to bias the ferrule 124 in a forward direction through a front bore 116 of the front housing 110. The elongated cylindrical rear portion 123 of the hub 122 extends into the cavity 114 of the front housing 110.

Figure 3:
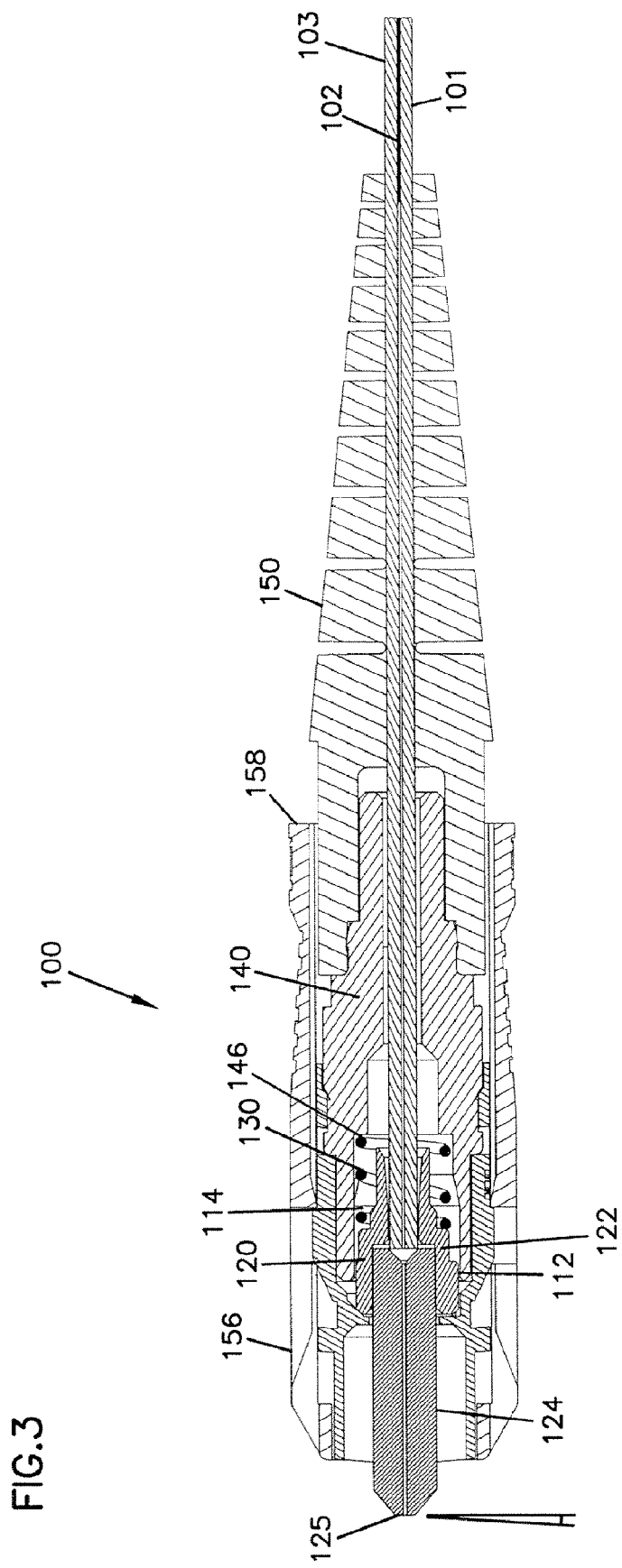
FIG. 3 is a cross-sectional side view of the connector of FIG. 1.
Figure 4:
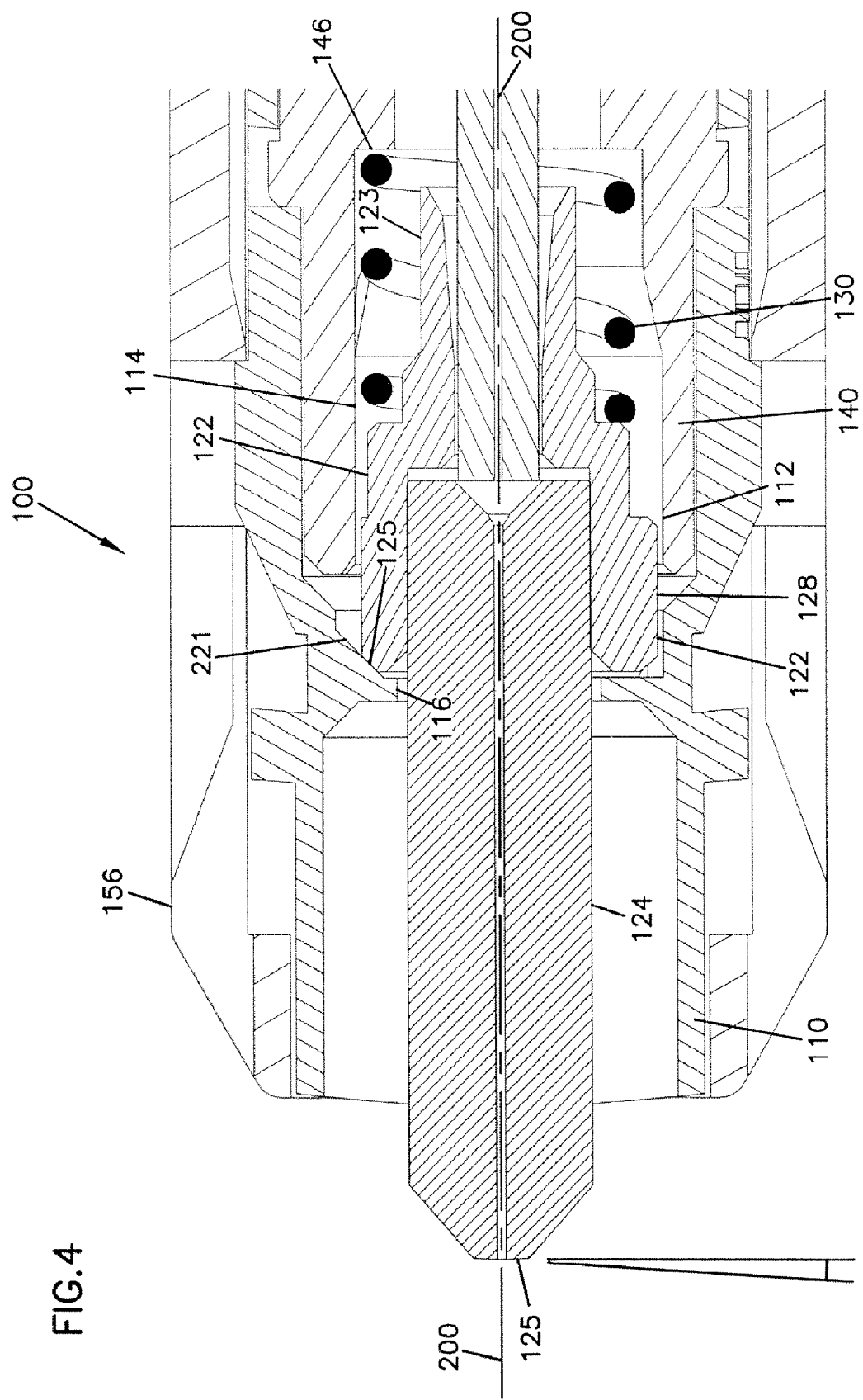
FIG. 4 is an enlarged cross-sectional side view of the front end of the connector of FIG. 3.
Figure 6:
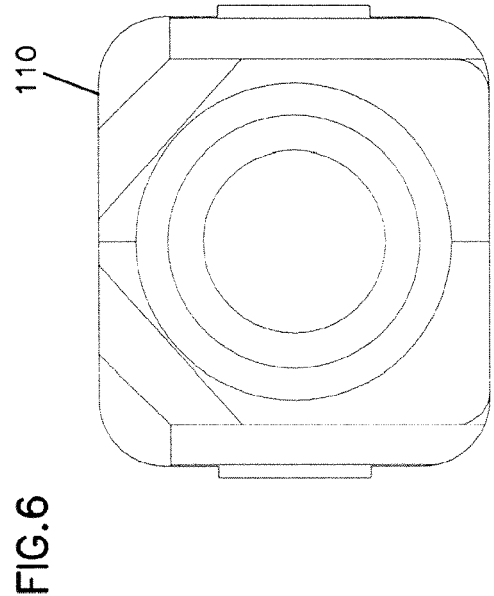
FIG. 6 is a front end view of the front housing of the connector.
Figure 8:
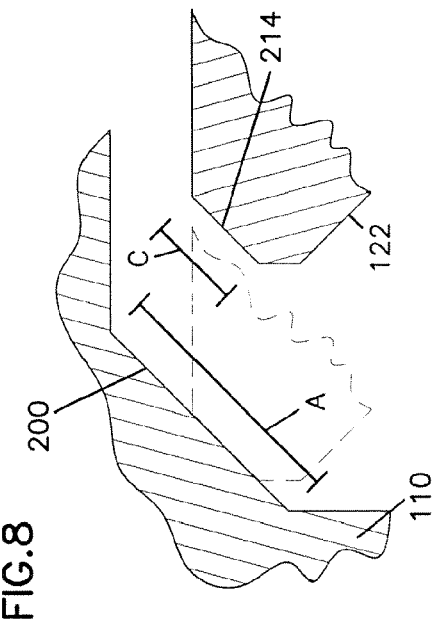
FIG. 8 shows in exploded view one pair of the mating contact surfaces in greater detail.

The complementary fit between the anti-rotation seat 112 and the anti-rotation portion 128 is designed to maintain the ferrule 124 in a specified orientation with respect to the longitudinal axis 200 of the connector 100. However, small variations in tolerances between the anti-rotation seat 112 and the anti-rotation portion 128 may cause the ferrule 124 to become misaligned a few degrees with respect to the longitudinal axis 200, thereby causing the face 125 of the ferrule 124 to be slightly misaligned, increasing the insertion loss when the connector 100 is mated to another connector through an adapter. Such misalignment can occur during initial assembly. Such misalignment can also occur when an end face of an APC connector is mated with an end face of another APC connector, and then one connector is removed. The spring bias returns the ferrule 124 of the hub 122 to the front position. The longitudinally extending surfaces of the anti-rotation portion 128 and the anti-rotation seat 112 maintain the general rotational positions of the hub 122 and the front housing 110, but small variations may be introduced. If not corrected, the next connection of the connector may result in rotationally misaligned end faces. The angled end face 125 is shown in FIGS. 3 and 4.

Referring now to FIGS. 3-8, the alignment features of connector 100 are shown. The front housing 110 includes a plurality of contact surfaces 220, 221, 222. The contact surfaces 220, 221, 222 on the housing 110 engage mating contact regions 214, 215, 216 on the hub 122. Preferably the contact surfaces 220, 221, 222 are angled at a 45-degree angle relative to the longitudinal axis 200. The contact regions 214, 215, 216 on the hub 122 are smaller planar surfaces also angled at a 45-degree angle relative to the longitudinal axis 200.

In the preferred embodiment, three mating contact surfaces 220, 221, 222 and contact regions 214, 215, 216, are provided on the connector 100. Two mating surfaces can also be utilized, if desired. Alternatively, more than three mating surfaces can be provided. Unused mating surfaces can be provided if greater numbers of surfaces on one of the hub 122 or the front housing 110 are provided. Depending on the relative positions on the hub 122 and the front housing 110, only three of the contact regions 214, 215, 216 are used. The other contact regions 214a, 215a, 216a are not used unless the connector is tuned.

As shown, the contact surfaces 220, 221, 222 are equally spaced about the longitudinal axis 200. Similarly, the contact regions 214, 215, 216 have center portions that are also equally spaced about the longitudinal axis 200.

By engagement of the respective pairs of angled contact surfaces and contact regions, alignment of the ferrule 124 relative to the housing 110 is provided. This alignment is greater than can be provided by the longitudinally extending sliding surfaces of the anti-rotation portion 128 and the anti-rotation seat 112.

As shown, the contact regions 214, 215, 216 are smaller than the contact surfaces 220, 221, 222. If the contact regions 214, 215, 216 were too large, such as if they are similarly sized relative to the contact surfaces 220, 221, 222, small angle variations during manufacture could cause drastic variations in the amount of extension of ferrule 124. If the ferrule 124 extended too far when mated to another connector, damage to the ferrules or connectors could occur. If the ferrule did not extend enough, poor signal transmission from connector to connector would result. Alternatively, if the contact regions 214, 215, 216 are quite small, such that a fairly sharp edge is defined, damage to the front housing 110 can occur, such as when relatively larger springs 130 are used. The connector could become damaged if the hub or housing is engaged with too much force by a sharp edge, such as in the case when plastic parts are used.

Figure 5:
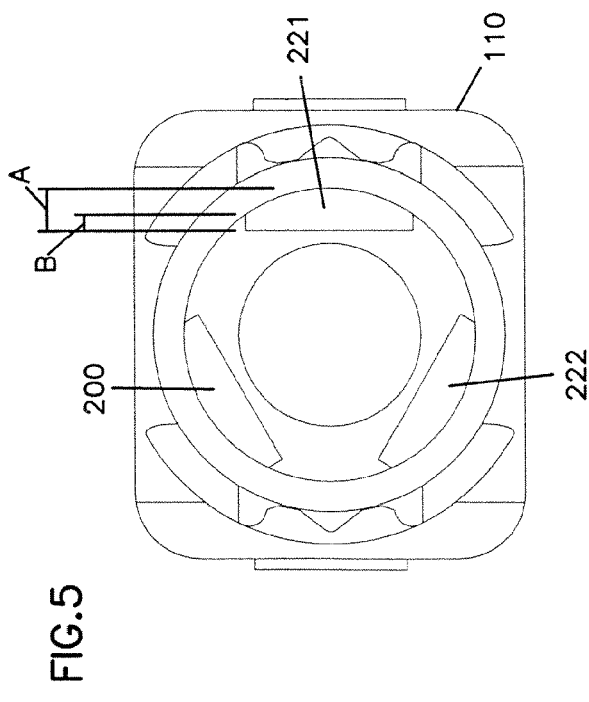
FIG. 5 is a rear end view of the front housing of the connector.

As one example, the hub 122 is made from metal, such as F/N 001 nickel silver CDA 792, and the front housing 110 is made from plastic, such as F/N 001 Ul tem. Contact surfaces 220, 221, 222 are about 0.036 inches long at the midpoint (dimension A in FIG. 5) and are angled 45 degrees +/−1 degree to the longitudinal axis 200. Contact surfaces 220, 221, 222 are smaller at the ends, at about 0.014 inches (dimension B). The view of FIG. 5 shows surfaces 220, 221, 222 at an angle. (Compare also to the cross-section of FIG. 4). Dimensions A and B noted above are taken parallel to the direction of extension of each surface. See also FIG. 8.

Figure 7:
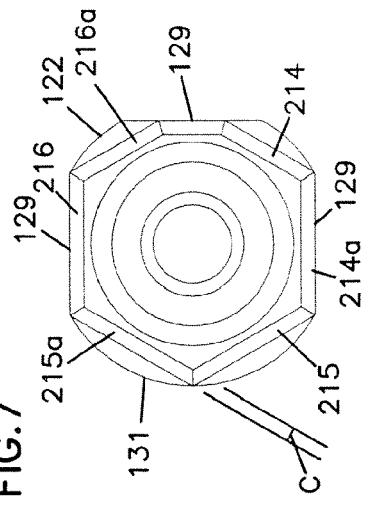
FIG. 7 is a front end view of the hub of the connector.

For an SC type connector in this example, it has been found that contact regions 214, 215, 216 of a length of about 0.0085 inches to 0.0100 inches (dimension C in FIG. 7) at 45 degrees +/−1 degree to the axis 200 result in appropriate mating with the front housing 110, without causing deformation of the front housing 110 or too much variation in the extension of the ferrule 124 as the angles on contact surfaces 220, 221, 222 vary plus or minus 1 degree. In FIG. 7, contact regions 214, 215, 216 are at an angle. Dimension C is parallel to the direction of extension. See also FIG. 8. This results in a variation of extension of the ferrule of 0.00130 inches. With an SC connector designed as noted above, an overall ferrule variation of extension of 0.014 inches is achieved. The dimension of 0.014 inches is an industry accepted ferrule variation resulting in proper connections with mating connectors.

In the preferred embodiment, contact regions 214, 215, 216 are planar and smaller than contact surfaces 220, 221, 222.

Variations in the angle for the mating contact surfaces are possible. The illustrated example shows 45 degree angles from a plane transverse to the longitudinal axis. Other angles can be used such as 60 degrees. However, for the greater angles, greater variation in ferrule extension may be noticed as variations occur during manufacturing for the precise angles and locations of the mating contact surfaces.

By utilizing three equally spaced contact surfaces 220, 221, 222, mated with contact regions 214, 215, 216, less tilting of the ferrule 124 relative to the longitudinal axis 200 occurs. The effect of three equally spaced mating surfaces is similar to a three-legged stool or a tripod. Three surfaces are advantageous over two, because they do not provide any centering effect in a direction parallel to the two surfaces. Increasing the number of mating surfaces can further reduce tilting effects if more than three surfaces are mated. It is to be appreciated that the angled surfaces on hub 122 are not all equally sized. However, the effect of having three of them (214, 215, 216 or 214a, 215a, 216a) mate with surfaces 220, 221, 222 is to create a tripod effect.

Some fiber optic connectors are tunable by unseating the ferrule and associated hub from the anti-rotation seat. The ferrule and associated hub is pushed back from the resting position by pressing the ferrule back into the connector. The anti-rotation portion of the hub clears the complementary-shaped anti-rotation seat of the connector. In this position, the ferrule can be rotated about a connector axis to the desired rotational alignment that minimizes signal loss. The ferrule can then be released, allowing the anti-rotation portion of the hub to re-engage the anti-rotation seat, thereby preventing further rotation that may cause the connector to become untuned. In a connector of this style, the contact surfaces 220, 221, 222 would similarly engage the contact regions 214, 215, 216 to align the ferrule to a precise position for the new tuned location. After the ferrule is pushed back so that the hub disengages from the angled contact surfaces such as when a connection to another connector occurs, and then the connector is disconnected, the ferrule is then realigned with front housing by the reengagement of the contact surfaces 220, 221, 222 and the contact regions 214, 215, 216.

The above specification, examples and data provide a complete description of the manufacture and of the invention. Since many embodiments of the invention can be made without departing from the spirit and scope of the invention, the invention resides in the claims hereinafter appended.

What is claimed is:

1. A fiber optic connector having a longitudinal axis, the connector comprising;
   a ferrule defining an opening for receiving an optical fiber, the ferrule including an end;
   a hub engaging the ferrule, the hub including a body, a front portion, and a front end, the front portion defining first, second, and third hub contact portions that each extend from the body to the front end at a first angle with respect to the longitudinal axis, the first hub contact portion having a first hub contact surface, the second hub contact portion having a second hub contact surface, and the third hub contact portion having a third hub contact surface;
   a housing defining a bore, a chamber, and first, second, and third housing contact portions each extend at a second angle with respect to the longitudinal axis, the first housing contact portion having a first housing contact surface, the second housing contact portion having a second housing contact surface, and the third housing contact portion having a third housing contact surface; and
   a spring disposed within the chamber defined by the housing, the spring biasing the ferrule through the bore of the housing;
   wherein the first hub contact surface contacts the first housing contact surface, the second hub contact surface contacts the second housing contact surface, and the third hub contact surface contacts the third housing contact surface so that the end of the ferrule is maintained at a known orientation with respect to the longitudinal axis of the connector; and
   wherein the first, second, and third housing contact portions are disposed around the longitudinal axis of the connector to form a tripod configuration such that only the first, second, and third housing contact surfaces contact the first, second, and third hub contact surfaces when the spring biases the ferrule through the bore of the housing.

2. The fiber optic connector of claim 1, wherein the fiber optic connector is an SC fiber optic connector.

3. The fiber connector of claim 1, wherein the first and second angle are 45 degree angles.

4. The fiber optic connector of claim 1, wherein each of the first, second, and third hub contact surfaces is a planar surface that is sized smaller than the first, second, and third housing contact surfaces.

5. The fiber optic connector of claim 1, further comprising the optical fiber.

* * * * *